Sept. 16, 1952     J. F. McKEE ET AL     2,610,366
AIRPLANE HANGAR DOOR
Filed May 11, 1946     6 Sheets-Sheet 1
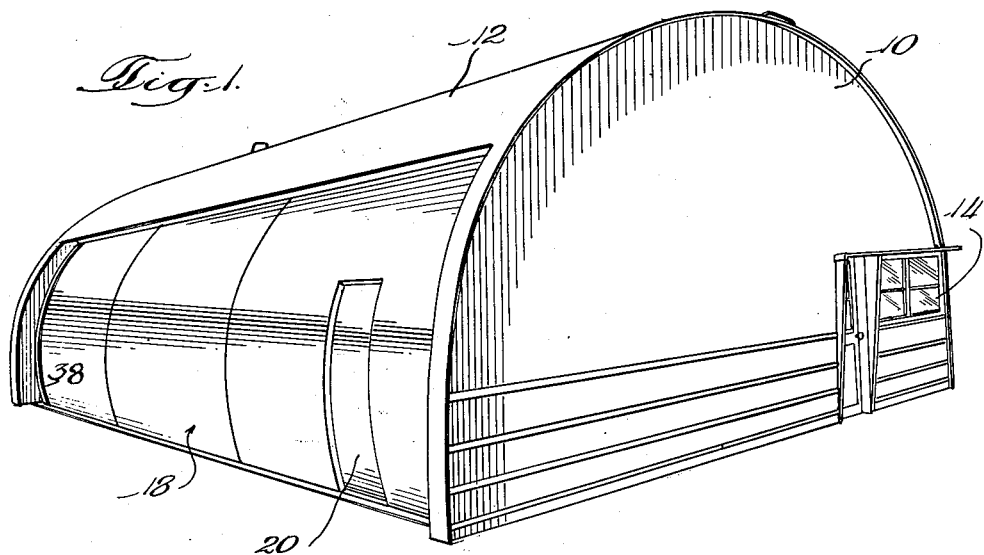
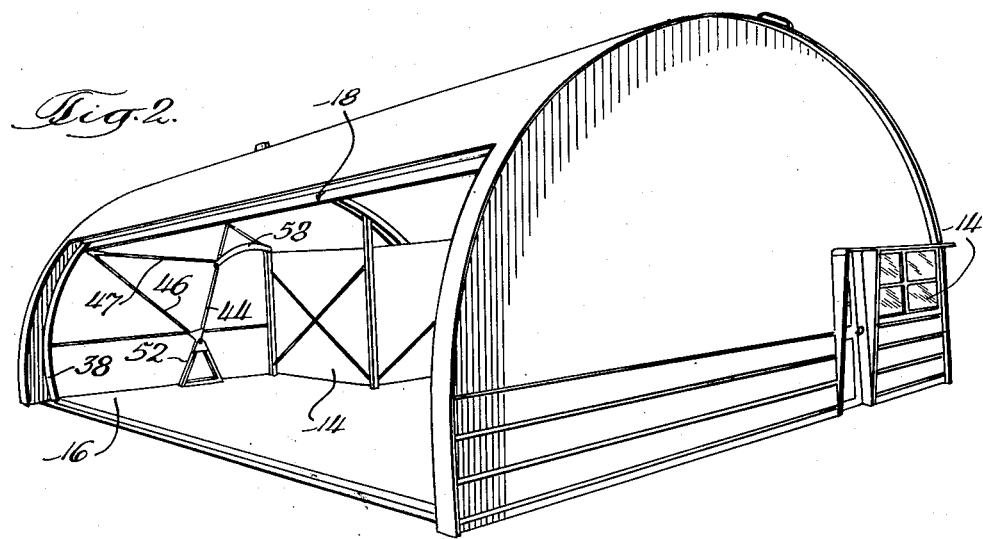
Inventors:
John F. McKee
Melvin E. Hartzler
By Hinkle, Horton, Ahlberg, Hausmann & Kupper
Attorneys

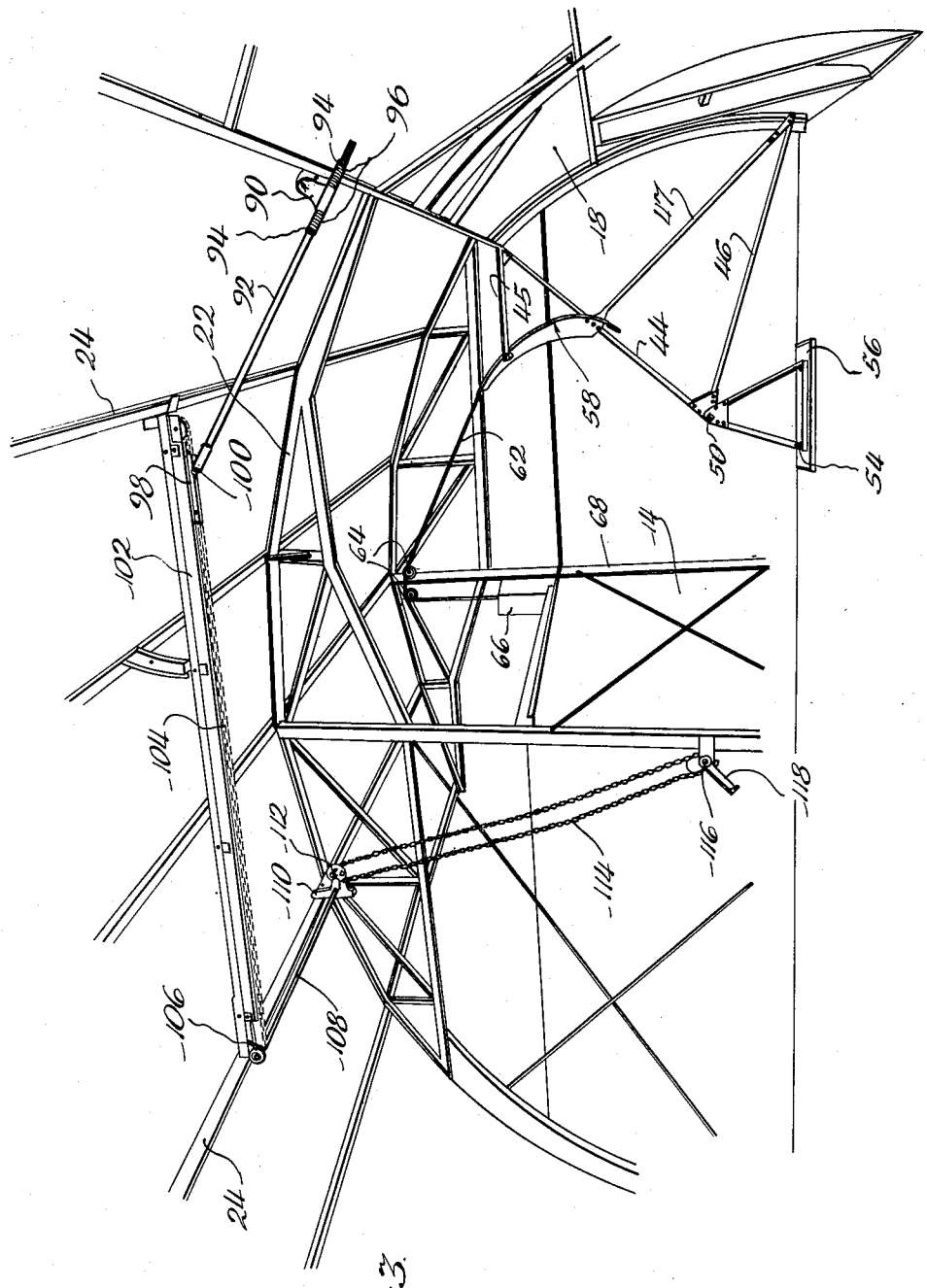

Sept. 16, 1952  J. F. McKEE ET AL  2,610,366
AIRPLANE HANGAR DOOR

Filed May 11, 1946  6 Sheets-Sheet 3

Inventors
John F. McKee
Melvin E. Hartzler
By Henkle, Horton, Ahlberg, Hausmann & Kuppe
Attorneys Sept. 16, 1952　　　J. F. McKEE ET AL　　　2,610,366
AIRPLANE HANGAR DOOR Filed May 11, 1946　　　　　　　　　　　　　　6 Sheets-Sheet 4

INVENTORS.
John F. McKee
Melvin E. Hartzler
By Hinkle, Horton, Ahlberg, Hausmann & Wupper
attorneys

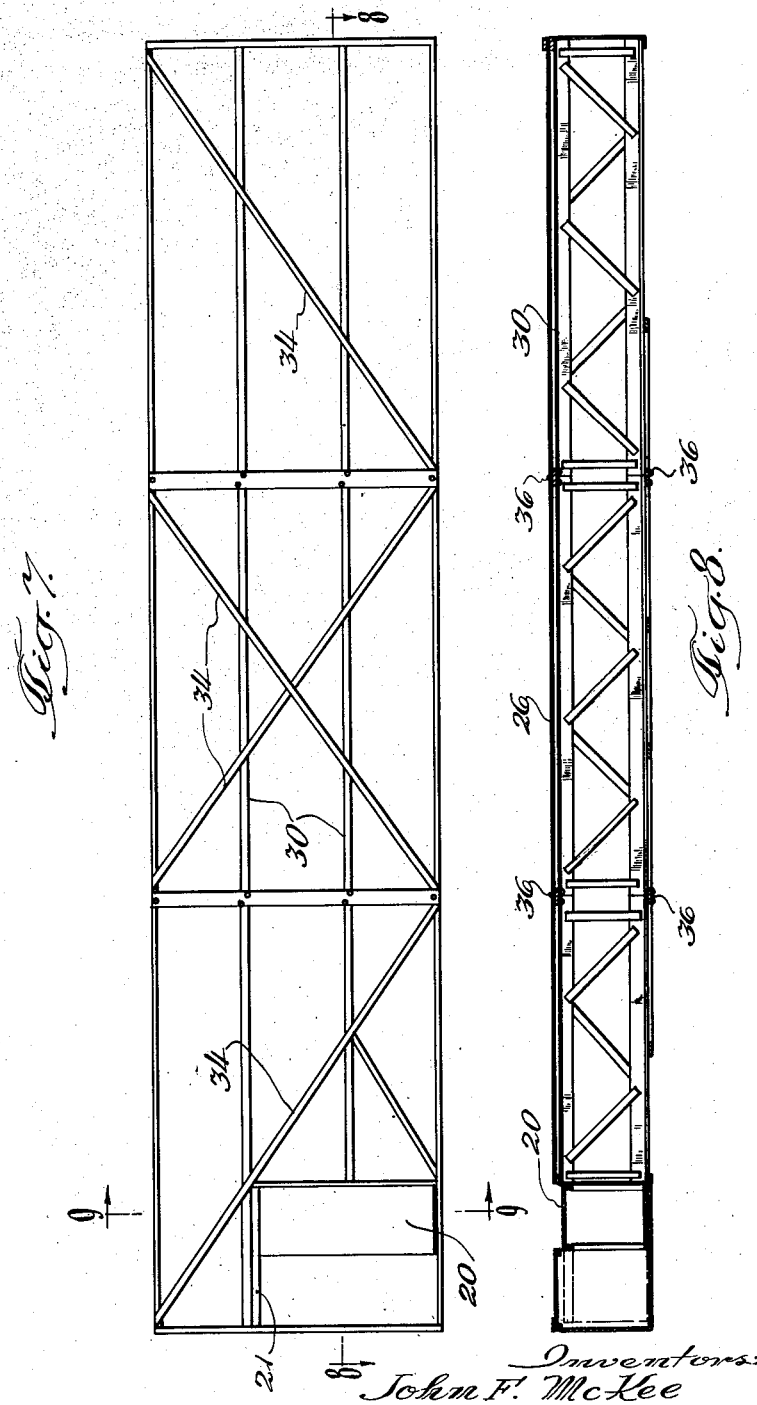

Sept. 16, 1952     J. F. McKEE ET AL     2,610,366
AIRPLANE HANGAR DOOR

Filed May 11, 1946     6 Sheets-Sheet 6

Inventors:
John F. McKee
Melvin E. Hartzler
By Hinkle, Horton, Ahlberg, Hausmann & Kupper
attorneys Patented Sept. 16, 1952

2,610,366

UNITED STATES PATENT OFFICE 2,610,366

AIRPLANE HANGAR DOOR

John F. McKee, Aurora, and Melvin E. Hartzler, Downers Grove, Ill., assignors to McKee Door Company, Aurora, Ill., a corporation of Illinois Application May 11, 1946, Serial No. 669,078

3 Claims. (Cl. 20—16)

The present invention relates to buildings and more particularly is concerned with a building having a comparatively wide and high door opening, such as an airplane hangar, for instance. Primarily, the invention resides in the door for the building and the portion of the building structure associated with the door and door mechanism.

One of the objects of the present invention is to provide an improved building of the type described which may be of lighter construction that is customary and is readily prefabricated.

An additional object of the present invention is to provide an improved wide span door which is easily operated and which puts substantially no load upon the building structure.

Still another object of the present invention is to provide a novel door for a hangar or similar type building which seals tightly when closed and which may be opened with a minimum of frictional drag between the door and building proper.

Yet another object of the present invention is to provide a novel door, and hangar type building adapted for use therewith, together with novel counterbalancing means for the door.

Other objects and advantages will become apparent from the following description of a preferred embodiment of our invention which is illustrated in the accompanying drawings.

In the drawings, in which similar characters of reference refer to similar parts throughout the several views:

Fig. 1 is a front quarter perspective view of a hangar building embodying the present invention. In this view the door is shown in the closed position;

Fig. 2 is a view similar to Fig. 1 except showing the door in the open position;

Fig. 3 is a perspective view of the inside of the building shown looking toward one end thereof. In this view, the door is illustrated in the closed position;

Figs. 5 and 6 also illustrate how the force moments of the door and counterbalancing system operate throughout movement of the door from open to closed position;

Fig. 7 is an inside view of the door showing the trussing;

Fig. 8 is a view of one of the trusses and may be considered as taken in the direction of the arrows substantially along the line 8—8 of Fig. 7;

Figure 4:
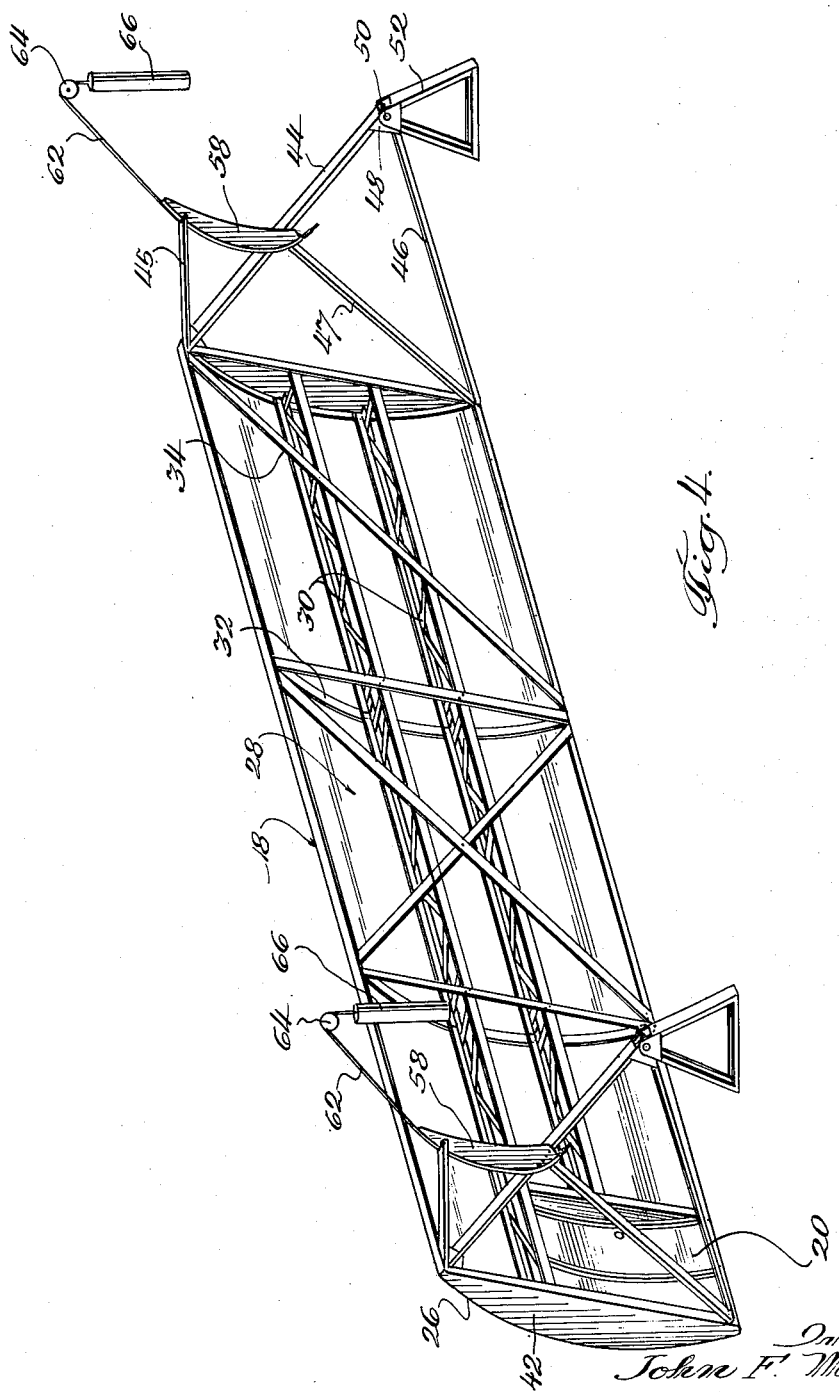
Fig. 4 is a perspective view of the inside of the door only, shown in the down position.
Figure 9:
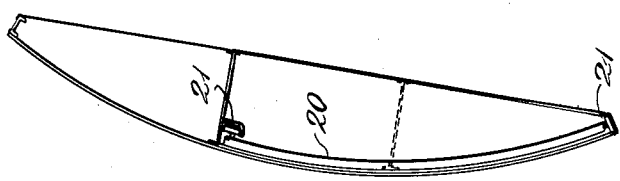
Figure 10:
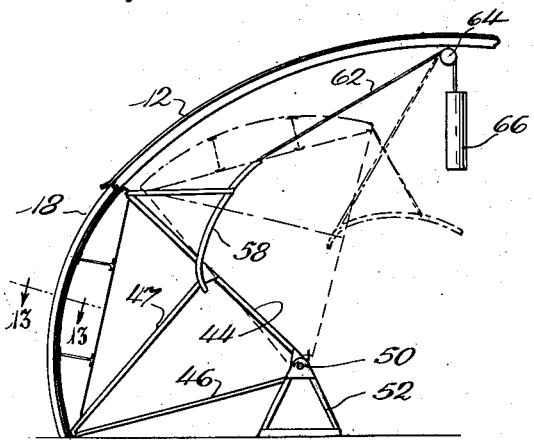
Figure 11:
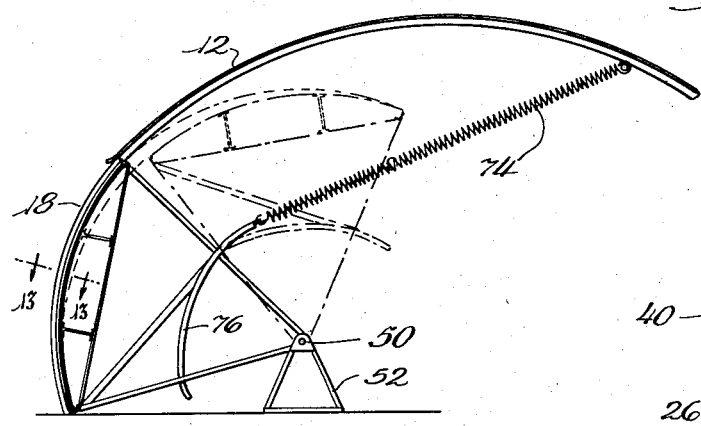
Figure 13:
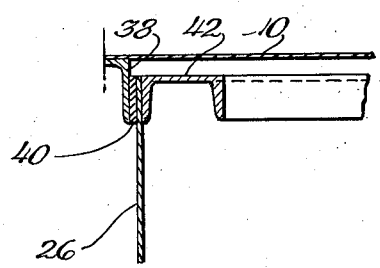
Figure 12:
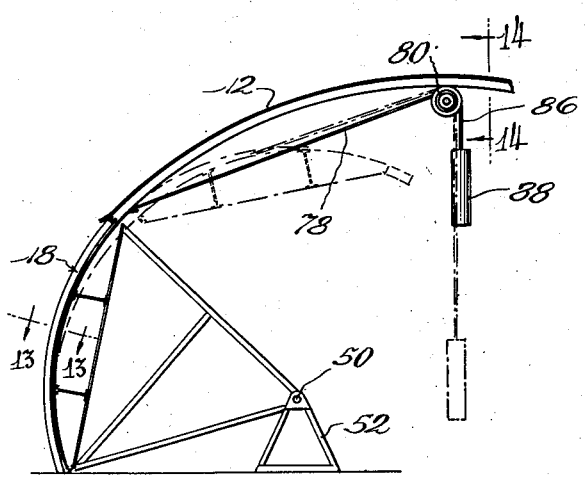
Figure 14:
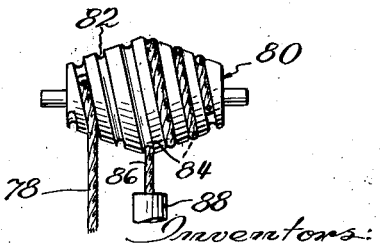

Fig. 9 may be considered as a sectional view showing a small entrance door which forms a portion of the large door. This view may be considered as a section taken in the direction of the arrows along the line 9—9 of Fig. 7;

Figs. 10, 11 and 12 are diagrammatic end views of the hangar, door and door mechanism showing alternative arrangements for counterbalancing the door;

Fig. 13 may be considered as a substantially horizontal sectional view through one of the door ends and associated jambs with the door in closed position. It may be considered as taken in the direction of the arrows substantially along the line 13—13 of any one of the Figs. 10 to 12, inclusive; and Fig. 14 is a detail view of a differential pulley forming a portion of the embodiment illustrated in Fig. 12. This view may be considered as taken in the direction of the arrows substantially along the line 14—14 of Fig. 12.

Aircraft hangars and similar type buildings are characterized by the fact that they provide a large enclosed space having a door opening which extends the major portion of the height of the building and which usually is almost as long as the building. It is customary to provide such doors in several sections which roll horizontally upon either top or top and bottom tracks into positions beyond the ends of the hangar. In more elaborate installations, the door may be provided in sections which roll upwardly so as to clear the door space.

Since hangar doors are necessarily large in proportion to the size of the buildings and since normally the major portion of the weight of the doors is carried by the building structure, it is apparent that since the building must be designed and constructed to carry the door weight it is therefore more expensive than it would be if the door were self-supporting. The present invention overcomes this and other objections to conventional practice and provides a door which can be used in a single piece and which because of its construction and shape is admirably suited to stand wind loads and to support its own weight without objectional distortion in any position. Further, the door is provided with an arrangement such that it is supported upon its own foundation and in fact touches the hangar structure only when in the completely down position at which point a sealing strip upon the door engages a portion of the door frame or jamb so as to prevent leakage.

In Fig. 1 of the drawings we have shown a perspective view of a hangar which is substantially semicylindrical in shape. Preferably, it is formed of structural steel shapes cut and welded together to form prefabricated trusses in an appropriate and well known manner and then is covered with sheet metal to form a tight enclosure. As seen in Fig. 1, the ends of the building are indicated generally by the numeral 10, while the curved wall which forms the back, roof and a portion of the front wall is indicated by the numeral 12. If desired, office or shop space 14 may be partitioned off at one or two of the corners of the building at the back, particularly if the building is of such size that the aircraft to be housed therein do not occupy substantially the full internal space.

At the front of the building, a large generally rectangular opening 16 is provided through which aircraft can be moved from the interior to the exterior thereof. This opening is closed by an overhead-type door 18 which has slightly less radius of curvature than the face of the building and is set back slightly, so that it can move into an overhead position inside of the building while clearing the building roof and trussing which supports the latter. This is best shown in Fig. 3. For the convenience of the users, the large door 18 may be provided with a small entrance door 20 which is recessed slightly behind the surface of the large door and which slides to one side on top and bottom tracks 21.

The building with the exception of the door may be largely conventional in construction in that it is comprised of the necessary built-up trusses 22 to support a plurality of longitudinally extending stringers 24 which in turn support the sheet metal roof 12 previously referred to. Preferably, although not necessarily, the structural members are cut from standard shapes and are welded together in unitary subsections which may be prefabricated in jigs and later assembled by bolting or riveting together at the point of erection. Since the door 18 swings upwardly in a manner to be described presently into an overhead position so as to clear the opening, the trusswork throughout the generally arcuate portion within which the door swings should be arranged, as illustrated in Fig. 3, so as to clear the face of the door. Inasmuch as the invention is not primarily concerned with the structure of the hangar building per se, but rather with the door and the operating mechanism, the above description of the building proper is believed sufficient for the present purpose.

The door 18 comprises a convex sheet metal front wall 26 which is secured to and supported by internal trussing 28 formed of longitudinally extending stringers 30 which support vertical ribs 32. This structure is in turn braced by diagonally extending members 34 and, if desired, may be formed in a plurality of sections as is best indicated in Fig. 8 where the door is shown as divided into three pieces which may be prefabricated and bolted together at their adjacent edges 36. The door as thus constructed is sufficiently strong with comparatively little internal trussing. At any rate, it is one of the features of the present invention to provide a door of this type which is sufficiently strong so that it may be supported at the ends alone and when thus supported will resist any anticipated wind load and will avoid troublesome flexure when supported by the ends in different positions.

This door is located substantially immediately inside the door opening and, as may be best seen in Fig. 13, the end wall 10 of the building supports an inwardly extending jamb 38 which is curved so as to fit the front face of the convex door. At its ends, the door covering 26 is provided with jamb strips 40 of rubber, canvas, or similar material which presses against the jamb 38 so as to seal the door against leakage. Preferably, the jamb strips 40 should be located directly opposite the end door frame members 42 which are similar in shape to the ribs 32 so as not to stress the sheet metal door covering.

The end frame members 42 are connected to upper and lower rearwardly extending door supporting arms 44 and 46, respectively, which together form a triangular yoke braced by a diagonal member 47. At the apex where these two members are brought together they are secured in rigid relationship by being welded or otherwise secured to gusset plates 48 or other suitable structural elements. A bearing is associated with the gusset plate 48 at each end of the door and this bearing which has its axis parallel to the face of the door is journaled upon a horizontal pin or bolt 50 secured at the upper end of a triangular standard 52. The standards are formed of inner and outer structural members which straddle the yoke 44 and support the bearing pins 50 at each end of the door. The lower end of each standard 52 is secured by means of nuts 54 to bolts or threaded reinforcing rods, the other ends of which are fixed within the top of a concrete pier or foundation member 56.

The door may be swung about the pins 50 into a position above the door opening and underlying the roof of the hangar, under which conditions the weight of the door is carried entirely by the pins 50 and upon the separate piers or foundation members 56 which form no portion of the structure of the hangar building proper. Under no conditions, therefore, does the door place any load upon the building. Preferably, so as to keep as large a free space within the hangar as possible, the piers 56 are located immediately adjacent the end walls of the hangar.

Inasmuch as a door of the size necessary in buildings of this character is comparatively heavy, it is preferable to provide a counterbalancing system sufficiently effective so that for all practical purposes the only energy necessary to be expended in opening the door consists merely in that necessary to overcome friction. The counterbalancing system to be described presently has been found to be effective throughout the entire range of operation of the door to a degree such that the door will remain in any set position. It has been found practical, therefore, to provide a simple manually operated crank door opener for moving hangar doors of this type in even comparatively large sizes. Of course, if desired, motor driven door openers may be used and will be preferable for very large doors.

Figure 6:
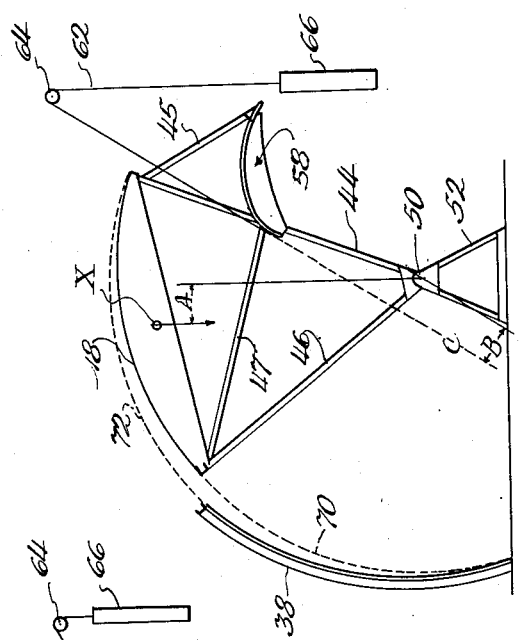
Fig. 6 is similar to Fig. 5 excepting that it shows the door in open position.
Figure 5:
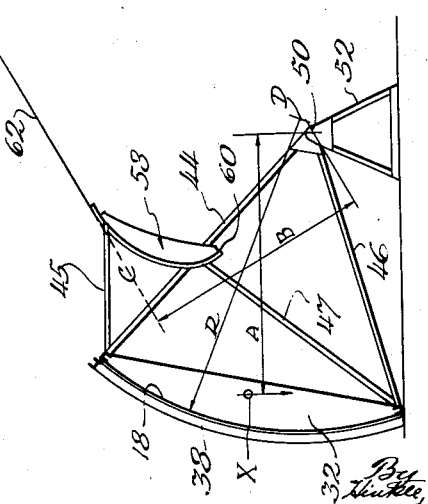
Fig. 5 is a diagrammatic end view of the door and counterbalancing mechanism. In this view the door is illustrated in closed position.

The counterbalancing system comprises a curved cam-like track 58 formed of channel iron which is rigidly secured to the upper arm 44 and braced by a strut 45. A cable lies over the face of this track and has one end secured to the lower end 60 thereof in any suitable manner. With the door in closed position the shape of the track is such that the cable extends from the point of attachment 60 in a direction forwardly and upwardly and gradually curves around until it is extending in a direction upwardly and backwardly. From the end of the cam-like track 58 the cable 62 extends rearwardly and upwardly in the hangar and passes over one or more pulleys 64 located centrally in the hangar from front to back. From the pulley or pulleys 64 the cable extends downwardly and is secured to a counterweight 66. As shown in Fig. 3, the pulleys 64 are secured to the hangar building itself near the upper end of one of the vertical structural members 68 which supports the roof truss. This one member 68, therefore, should have sufficient strength to carry the counterweight or, if desired, a separate post may be provided entirely independent of the building proper for the purpose of carrying the counterweight pulleys. As may be best seen in Figs. 5 and 6, the cam track 58 is so formed that the distance A times the weight of the door equals the distance B times the weight of the counterweight in all positions of the door when A is the horizontal distance between the center of gravity indicated at X of the door system and the pivot point 50 and B is the shortest distance from the pivot point to the line C which is an extension of the line of the cable passing from the cam track 58 to the pulley 64. With this arrangement, the weight of the counterweight 66 can be adjusted so as substantially exactly to balance the weight of the door in one position, with the result that the door will be balanced in all positions.

So as to provide a good seal between the door and the jambs without excessive friction throughout the movement of the door, the pivot point 50 is so positioned that the upper arm 44 of the door supporting yoke is slightly longer than the lower arm 46. In other words, the center of curvature of the door, indicated at D on the radius line R, is above the horizontal pivoting axis 50 of the door. The result of this arrangement is that when the door is moved the lower end passes through a circle of smaller radius, indicated at 70, than the circle generated by the upper end of the door, the latter circle being indicated at 72. This effect will best be seen in Figs. 6 and 10 where it becomes apparent upon inspection that as soon as the door commences to move upwardly from its closed position it will be retracted from the jambs on both sides from top to bottom and will thereafter move freely out of contact with the door jambs or other parts of the hangar building. Similarly, when the door is lowered, it will move freely until just before reaching the lowermost position whereupon it comes into contact with the jambs throughout their full lengths substantially simultaneously.

Alternative counterbalancing schemes for accomplishing much the same effect are illustrated in Figs. 11 and 12. In Figure 11 a coil spring 74 has been substituted for the weight 66 and cable 62. As in the previous instance, however, the lower forward end of the spring is secured to a length of cable which passes over an arcuate track 76 similar to the cam-shaped track 58 excepting that its shape is modified somewhat from that of Figs. 5, 6 and 10 because the spring rate will change somewhat at different positions of the door. In other words, the spring will tend to exert a stronger pull when the door is down than it will when it is up, and therefore the track 76 will more closely approximate an arc of a circle with its center of curvature adjacent the pivot point 50.

In the arrangement of Fig. 12, a cable 78 is secured to the upper portion of the door at a convenient point or it may be passed downwardly over a portion of the face of the door so that the door face acts as a sheave for the cable, the opposite end of this cable 78 being connected to a differential drum 80 shown in greater detail in Fig. 14. This differential drum is provided with a spiral groove 82 of varying distance from the center of rotation so that as the cable is wound upon the drum the point at which the cable leaves the drum tangentially will vary with respect to its distance from the center of rotation so as to give the desired force moment. Another portion of this drum 80 is provided with a similar spiral groove about which a second cable 86 is wound, the latter cable being connected to a counterweight 88. Since as the door swings from its lower position to the uppermost position the center of gravity moves rearwardly toward the axis of rotation 50, it will be appreciated that when the door is in its lower position the cable 78 should run off the portion of the groove 82 having the smallest diameter while the cable 86 connected to the counterweight 88 should enter the groove 84 at its largest diameter. As the door moves toward the uppermost position the cable 78 will be wound upon portions of the groove 82 having larger and larger diameter while conversely the cable 82 will be paid out so as to lie upon portions of the groove 86 of smaller diameter.

Actual movement of the door is accomplished by the mechanism best illustrated in Fig. 3 wherein it will be seen that the top of the door at its center is connected by means of a hinge 90 to a bar 92 which passes therethrough and which is provided on each side of the hinge 90 with collars 94 which hold shock-absorbing coil springs 96 in compression between the collars and the hinge 90. The bar 92 extends rearwardly and upwardly and is secured at its opposite end to a small trolley 98 by means of a hinge joint 100, the trolley in turn being equipped with wheels which roll upon a horizontal track 102. This track extends rearwardly and is secured by means of suitable brackets to the longitudinally extending structural members 24. The rearward end of the trolley 98 is secured to a bicycle-type chain 104 which extends rearwardly to the opposite end of the track, around a sprocket 106 journaled thereon and thence forwardly around an idler sprocket not shown but located at the forward end of the track and thence backwardly where it is connected to the forward end of the trolley 98. The sprocket 106 is mounted upon the end of a shaft 108 which extends at right angles to the track 102 and is journaled at its opposite end in a bearing block 110. Another sprocket 112 is secured to the shaft 108 in a position adjacent the bearing block 110 and this sprocket is connected by means of an endless bicycle-type chain 114 to a drive sprocket 116 rotated by hand crank 118 and located within convenient reach of an operator. Preferably, the shaft 108 should be of appropriate length to locate the chain 114 and hand crank mechanism 118 out of the way where it will not interfere with movement of the aircraft within the hangar. In Fig. 3, it is shown as arranged adjacent the edge of the office or shop located at the corner of the hangar and indicated in Figs. 1 and 2 of the drawings by the numeral 14. Whether such office or shop or equivalent partitioned space is provided is largely a matter of choice and does not form a part of the present invention.

By rotating the crank 118 in one direction the shaft 108 and chain 104 are driven in the same direction, thus causing the trolley 98 to move rearwardly, for instance, thereby pulling upon the arm 92 which in turn pulls the door from closed to open position. By reversing the direction of rotation of the crank 118, the car 98 is moved forwardly, thereby pushing the door downwardly into closed position.

From the above it will be apparent that our invention accomplishes the objects set out for it and provides a door for a building which is easy to operate, puts no load upon the building, is economical of construction, is admirably suited for prefabrication, and in addition gives the building and door a neat appearance, since the door is always within the building. Further, of course, it permits several buildings to be arranged end to end without providing space beyond the ends of any of the buildings to accommodate doors when in their open position as is necessary with hangar doors of customary construction.

The counterbalanced door construction disclosed in this application is claimed in our divisional application Serial No. 301,946, filed July 31, 1952.

Having described our invention, what we claim as new and useful and desire to secure by Letters Patent of the United States is:

1. In a building having a wall formed substantially as a portion of a substantially horizontally disposed cylinder, said wall having an opening to form a doorway therein, a door for closing said opening, said door also being formed as a portion of a cylinder and being located within said building and behind said wall, said door being sufficiently rigid to be self-supporting, a single horizontal pivot to the rear of said door and adjacent each end thereof, supports for said pivots, a pair of arms attached to the door at each end thereof and rotatably mounted on the adjacent pivot whereby said door can be swung into an overhead position about an axis established by said pivots, sealing means on the peripheral edges of the front face of said door and cooperating curved jambs bordering said doorway opening, the vertically extending peripheral edges of said door and said sealing means conforming in curvature to the curvature of the jambs to adapt the door to be brought into sealing engagement with said jambs when the door is in its lowermost position, one arm of each pair being shorter than the other whereby said pivots are eccentrically located relative to the axis of curvature of said doorjamb so as to break the bond between said sealing means and said jamb upon initial upward movement of the door from closed position.

2. In a building having a wall formed substantially as a portion of a substantially horizontally disposed cylinder, said wall having an opening to form a doorway therein, a door for closing said opening, said door also being formed as a portion of a cylinder and being located within said building and behind said wall, said door being sufficiently rigid to be self-supporting, a single horizontal pivot to the rear of said door and adjacent each end thereof, supports for said pivots, upper and lower arms attached to the door at each end thereof and rotatably mounted on the adjacent pivot whereby said door can be swung into an overhead position about an axis established by said pivots, and cooperating curved jambs bordering said doorway opening, the vertically extending peripheral edges of said door conforming in curvature to the curvature of the jambs to adapt the door to be brought into sealing engagement with said jambs when the door is in its lowermost position, said upper arms being longer than the lower arms whereby said pivots are eccentrically located relative to the axis of curvature of said doorjamb so as to release said door from said jamb during initial upward movement of the door from closed position.

3. In a building having a wall formed substantially as a portion of a substantially horizontally disposed cylinder, said wall having an opening to form a doorway therein, a door for closing said opening, said door also being formed as a portion of a cylinder and being located within said building and behind said wall, said door being sufficiently rigid to be self-supporting, a single horizontal pivot to the rear of said door and adjacent each end thereof, supports for said pivots, a pair of arms attached to the door at each end thereof and rotatably mounted on the adjacent pivot whereby said door can be swung into an overhead position about an axis established by said pivots, cooperating curved jambs bordering said doorway opening, and sealing means adapted to engage between said door and said jamb when said door is in closed position, the vertically extending peripheral edges of said door, said jambs and said sealing means conforming in curvature to adapt the door to be brought into sealing engagement with said jambs when the door is in its lowermost position, one arm of each pair being shorter than the other whereby said pivots are eccentrically located relative to the axis of curvature of said door jamb so as to break the sealing engagement between said door and said jamb upon initial upward movement of the door from closed position.

JOHN F. McKEE.
MELVIN E. HARTZLER.

REFERENCES CITED

The following references are of record in the file of this patent:

UNITED STATES PATENTS

| Number | Name | Date |
|---|---|---|
| 759,188 | Ott | May 3, 1904 |
| 1,028,134 | Raymaker | June 4, 1912 |
| 1,908,659 | Cross | May 9, 1933 |
| 1,918,015 | Broome | July 11, 1933 |
| 1,940,485 | Beeman et al. | Dec. 19, 1933 |
| 2,037,085 | Naylor | Apr. 14, 1936 |
| 2,214,229 | Frasch | Sept. 10, 1940 |
| 2,355,956 | Dakan | Aug. 15, 1944 |

FOREIGN PATENTS

| Number | Country | Date |
|---|---|---|
| 364,261 | Great Britain | Jan. 7, 1932 |
| 516,770 | Great Britain | 1940 |
| 674,222 | Germany | 1939 |